US008875610B2

(12) United States Patent
Holliday

(10) Patent No.: US 8,875,610 B2
(45) Date of Patent: Nov. 4, 2014

(54) DIE LOCK FOR DIE RETAINING BOARD

(75) Inventor: Brightman Kenneth Holliday, Conyers, GA (US)

(73) Assignee: Atlas Die, LLC, Elkhart, IN (US)

( * ) Notice: Subject to any disclaimer, the term of this patent is extended or adjusted under 35 U.S.C. 154(b) by 381 days.

(21) Appl. No.: 13/008,934

(22) Filed: Jan. 19, 2011

(65) Prior Publication Data

US 2011/0174131 A1 Jul. 21, 2011

Related U.S. Application Data

(60) Provisional application No. 61/296,600, filed on Jan. 20, 2010.

(51) Int. Cl.
*B26D 5/08* (2006.01)
*B26D 7/26* (2006.01)

(52) U.S. Cl.
CPC ...... *B62D 7/2614* (2013.01); *B26D 2007/2607* (2013.01)
USPC ........................ 83/568; 83/698.11; 83/698.31

(58) Field of Classification Search
USPC ........... 83/698.31, 699.11, 117, 55, 542, 547, 83/566, 568, 582, 583, 698.11, 99.11
See application file for complete search history.

(56) References Cited

U.S. PATENT DOCUMENTS

| | | | | |
|---|---|---|---|---|
| 1,766,244 | A | 6/1928 | Cumfer | |
| 1,857,980 | A * | 5/1932 | Segal | 30/60 |
| 2,013,174 | A * | 9/1935 | Rice | 30/73 |
| 2,821,871 | A | 2/1958 | Sarno | |
| 3,036,478 | A | 3/1961 | Scott et al. | |
| 3,036,962 | A * | 5/1962 | McNutt | 205/661 |
| 3,115,805 | A | 12/1963 | Engelmann | |
| 3,530,750 | A | 9/1970 | Daniels | |
| 3,826,170 | A | 7/1974 | Jones et al. | |
| 3,835,746 | A | 9/1974 | Young, Jr. et al. | |
| 3,863,550 | A | 2/1975 | Sarka et al. | |
| 3,941,038 | A | 3/1976 | Bishop | |
| 4,052,886 | A | 10/1977 | Buick | |
| 4,360,168 | A | 11/1982 | Peterson, Jr. | |
| 4,422,546 | A * | 12/1983 | Charity | 206/77.1 |
| 4,566,678 | A * | 1/1986 | Anderson | 267/141.1 |
| 4,848,202 | A | 7/1989 | Crampton | |
| 4,923,350 | A | 5/1990 | Hinksman et al. | |
| 5,029,505 | A | 7/1991 | Holliday | |

(Continued)

OTHER PUBLICATIONS

Illustrated sourcebook of mechanical components, Editor: Parsley, R.O copyright 2000 McGraw hill p. 1623.*

*Primary Examiner* — Sean Michalski
*Assistant Examiner* — Jonathan G Riley
(74) *Attorney, Agent, or Firm* — Kilyk & Bowersox, P.L.L.C.

(57) ABSTRACT

A kerf lock is provided for the retention of die cutting dies in die slots of a retaining board. A retaining system is also provided and includes a plurality of lock slots oriented substantially perpendicularly to a direction of insertion of a die cutting die. The lock slots have open faces to permit communication with the die slots. When the kerf lock is located within a lock slot it extends into the die slot until a die is inserted into the die slot. Upon initial insertion of a die into the die slot, the kerf lock compresses laterally. Once the die is completely inserted, the kerf lock exerts a normal force against the die in the direction of the die slot wall opposite the open face. An inserted die cutting die can thus be securely held within the die slot.

18 Claims, 5 Drawing Sheets

(56) References Cited

U.S. PATENT DOCUMENTS

| | | | | | |
|---|---|---|---|---|---|
| 5,138,923 | A | | 8/1992 | Kent et al. | |
| 5,197,367 | A | * | 3/1993 | Holliday | 83/698.31 |
| 5,275,076 | A | * | 1/1994 | Greenwalt | 83/698.31 |
| 5,280,890 | A | * | 1/1994 | Wydra | 267/220 |
| 5,333,519 | A | * | 8/1994 | Holliday et al. | 76/107.8 |
| RE35,522 | E | | 6/1997 | Holliday | |
| 6,220,585 | B1 | * | 4/2001 | Heron | 267/153 |
| 6,345,814 | B1 | * | 2/2002 | Lawson | 267/70 |
| 6,394,369 | B2 | * | 5/2002 | Goenka et al. | 239/601 |
| 6,779,426 | B1 | * | 8/2004 | Holliday | 83/13 |
| 6,966,245 | B1 | * | 11/2005 | Simpson | 83/27 |
| 8,038,134 | B2 | * | 10/2011 | Mertens | 267/153 |

* cited by examiner

DIE LOCK FOR DIE RETAINING BOARD

CROSS-REFERENCE TO RELATED APPLICATION

The present application claims a priority benefit from U.S. Provisional Patent Application No. 61/296,600, filed Jan. 20, 2010, which is incorporated herein by reference in its entirety.

FIELD

The present teachings relates generally to retaining boards and more particularly to locks for holding steel rule dies of varying widths within a die cutting die slot of a retaining board.

BACKGROUND

Steel rule dies are widely used to cut a variety of materials such as cardboard and plastics into a desired shape. Often, the steel rule dies are pressure inserted into slots located in a board of wood or other suitable material. During operation of the cutter, these dies often become loosened and ultimately disengaged, thereby necessitating costly and time consuming interruption of the cutting process as repairs are undertaken. In addition, the slots are of varying widths to accommodate dies of varying widths, thus making standardization difficult.

Several attempts have been made to prevent this loosening of the steel rule dies. For example, U.S. Pat. No. 4,052,886 discloses a solid base material having caverns which are filled with semi-rigid filler material to anchor an inserted steel die. However, this method requires time-consuming filling and the ultimate strength of securing is dependant on the filler material selected. U.S. Pat. No. 3,941,038 discloses the use of S-wall shaped resilient members which pin the rule between itself and packing shims. This apparatus necessitates a difficult insertion of the rule between the resilient member and shims. A third proposal is shown in U.S. Pat. No. 3,835,746. A resilient support and spring are deformed upon insertion of the die and thereafter exert an upward force against the die to secure it in a slot. Such a deformation ultimately leads to mechanical failure of the retaining system as the dies are continuously replaced.

U.S. Pat. No. 5,029,505 discloses an apparatus for improved retention of steel rule dies inserted into slots of a retaining board. A plurality of housings, each having a spring and ball assembly, are inserted into chambers of a retaining board. The balls bias a steel rule die in an associated slot such that the rule is securely, yet removably, held in the slot. Manufacturing the spring and ball assembly inside the housing can be a complicated task.

SUMMARY

It is an object of the present teachings to provide a devise for securely retaining a die cutting die in a retaining board.

It is a further object of the present teachings to accomplish the foregoing object without difficult insertion of the device or the die cutting die.

It is yet another object of the present teachings to accomplish the preceding objects simply and economically.

It is a still further object of the present teachings to achieve the foregoing objects with an apparatus that is durable and long lasting.

It is another object of the present teachings to achieve the above objects for die cutting dies of varying widths.

Other objects and advantages will be apparent from the specification and drawings which follow.

The foregoing and additional objects are obtained by a device and system according to the present teachings, for securing a die cutting die, for example, a steel rule die, in an associated die slot in a retaining board. The retaining board can comprise at least one narrow chamber located adjacent to each die slot, having an open face that opens toward the die slot. The chamber can be oriented substantially perpendicularly relative to the direction of insertion of the die. A securing device, also referred to herein as a kerf lock, is provided for urging an inserted die cutting die normally towards an opposite wall of the die slot is located opposite the open face of the chamber and is positioned within the chamber. Accordingly, a die cutting die inserted in the die slot is securely held within the slot.

According to various embodiments, the securing device can comprise a generally rectanguloid member having a central through slot. The central through slot can comprise a top end having a first width, a bottom end having a second width, a widened through hole intersecting the top end and having a first minimum dimension, and a widened through hole intersecting the bottom end and having a second minimum dimension. The first minimum dimension can be larger than the first width and the second minimum dimension can be larger than the second width. The central through slot can have a maximum width in a middle portion thereof, and the maximum width can be the same as or greater than each of the first and second minimum dimensions when the securing device is not in use.

Although the phrase "die cutting die" is used oftentimes herein, it is to be understood that the dies referred to also include creasing dies, scoring dies, perforating dies, and the like. The dies can be of any material, for example, steel rule dies, aluminum dies, titanium dies, and the like.

BRIEF DESCRIPTION OF THE DRAWINGS

The present teachings will be more fully understood with reference to the appended drawings which are intended to illustrate, not limit, the present teachings.

DETAILED DESCRIPTION

According to various embodiments, a system and device are provided to secure a die cutting die in a die slot of a retaining board. The securing device comprises a generally rectanguloid member having a central through slot. The central through slot can comprise a top end having a first width, a bottom end having a second width, a widened through hole intersecting the top end and having a first minimum dimension, and a widened through hole intersecting the bottom end and having a second minimum dimension. The first minimum dimension can be larger than the first width and the second minimum dimension can be larger than the second width. The central through slot can have a maximum width in a middle portion thereof, and the maximum width can be the same as or greater than each of the first and second minimum dimensions when the securing device is not in use.

In some embodiments, the generally rectanguloid member is 0-shaped or -shaped and comprises rounded top edges and rounded bottom edges. The securing device can be of one-piece, unitary construction. The securing device can comprise a plastic material, a polyalkylene material, a polytetrafluoroethylene material, a polyoxymethylene material, a polyacetal material, a polyformaldehyde material, a phenolic resin material, a combination thereof, or the like. In some embodiments, the securing device comprises a polytetrafluoroethylene material. In some embodiments, the securing device comprises a polyoxymethylene material.

Figure 4:
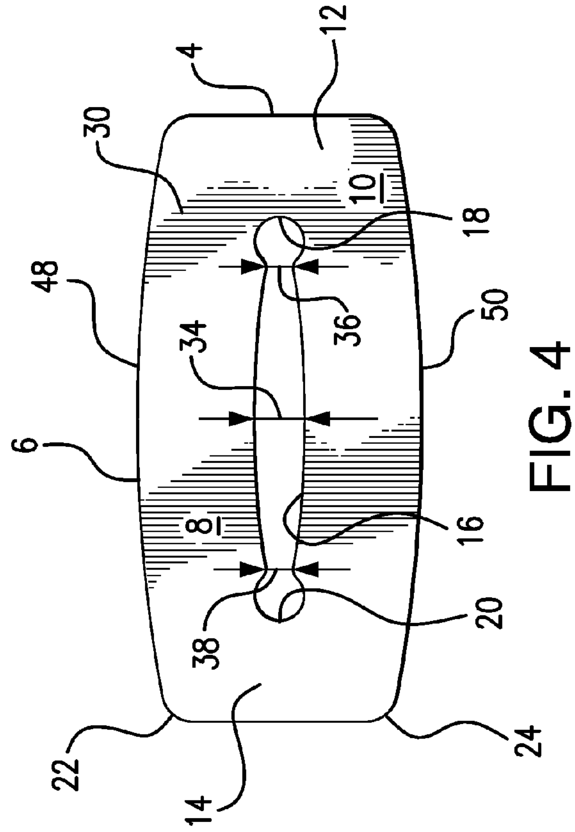
FIG. 4 is a bottom view of a kerf lock according to various embodiments of the present teachings.
Figure 7:
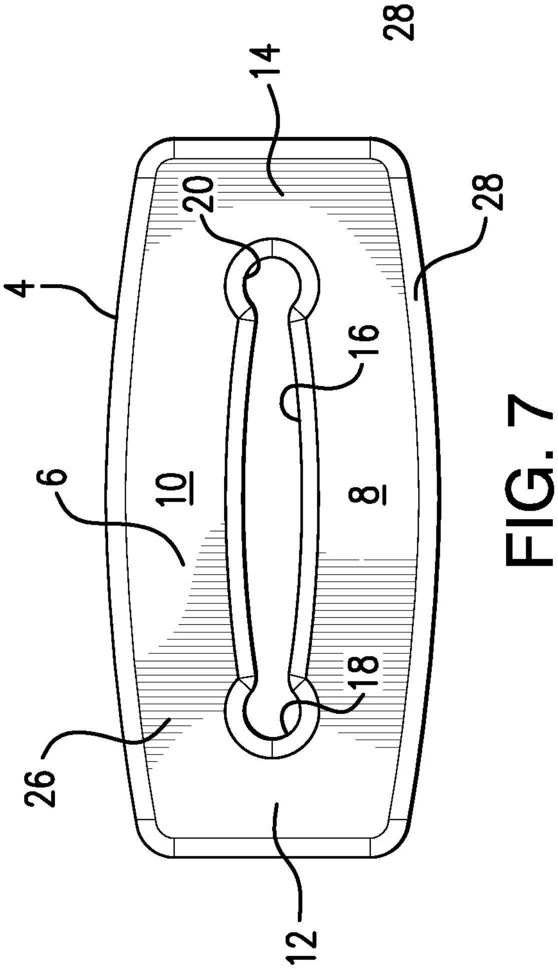
FIG. 7 is a top view of the kerf lock of FIG. 4.
Figure 8:
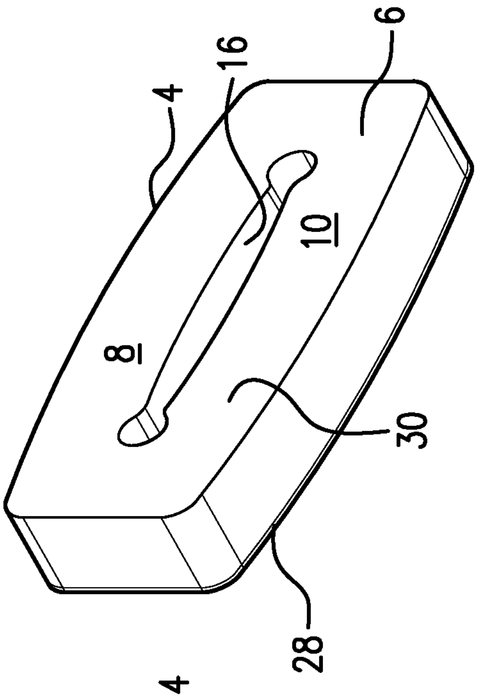
FIG. 8 is a bottom perspective view of the kerf lock of FIG. 4.

The device can have a first resilient arm on one side of the central through slot, and a second resilient arm on an opposite side of the central through slot, wherein both the first resilient arm and the second resilient arm are configured to move toward one another as the generally rectanguloid member is compressed laterally, for example, when in use. The central through slot can have a longitudinal middle and a width that increases from the top end to the middle. In some embodiments, as is shown in FIGS. 4, 7, and 8, the central through slot has a longitudinal middle and a width that increases from the top end to the middle and from the bottom end to the middle. The central through slot has a length and a maximum width, and the length can be many times the width, for example, from about five times to about 10 times the dimension of the maximum width from about six times to about eight times the maximum width, or about seven times the maximum width.

The generally rectanguloid member can comprise a top face and an opposite bottom face, and one or both of the top face and the bottom face can have tapered edges. The through holes that intersect the central through slot can be circular cross-section, and the first minimum dimension and the second minimum dimension can be diameters. The central through slot can have a maximum width that is greater than the first minimum dimension and greater than the second minimum dimension. In some embodiments, the central through slot has a maximum width that is the same as the first minimum dimension and the same as the second minimum dimension.

According to yet other embodiments of the present teachings, a system is provided that comprises a retaining board, a die cutting die, and a securing device as described herein. The retaining board can have formed therein an elongated die slot having opposite sides, and a lock slot intersecting the elongated die slot. The die cutting die can be disposed within the die slot, and the securing device can be disposed within the lock slot and in contact with the die cutting die. In some embodiments, the retaining board has first and second opposing faces, the securing device has an upper surface and a lower surface, the upper surface is spaced from the first opposing surface, and the lower surface is spaced from the second opposing surface.

In some embodiments, the system can comprise a plurality of securing devices and the retaining board can have formed therein a plurality of lock slots each intersecting the elongated die slot. The plurality of securing devices can be respectively disposed within the plurality of lock slots and in contact with the die cutting die.

Figure 1:
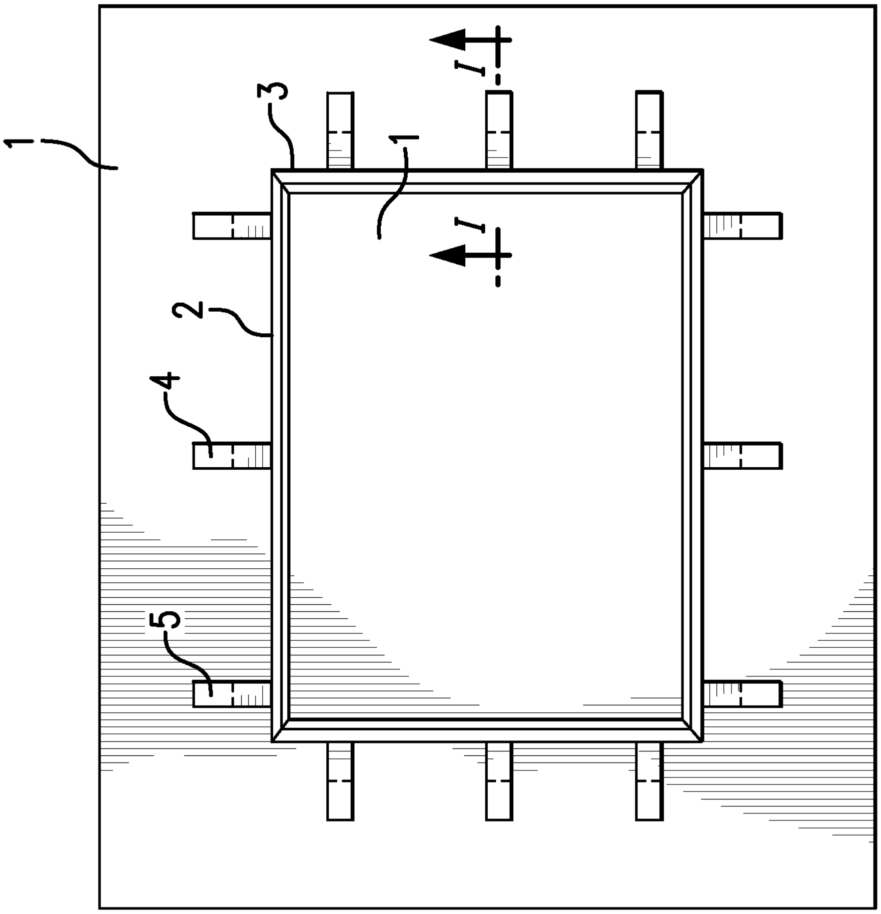
FIG. 1 is a top view of a steel rule die retaining board according to the present teachings having lock slots wherein kerf locks according to the present teachings can be disposed.
Figure 2:
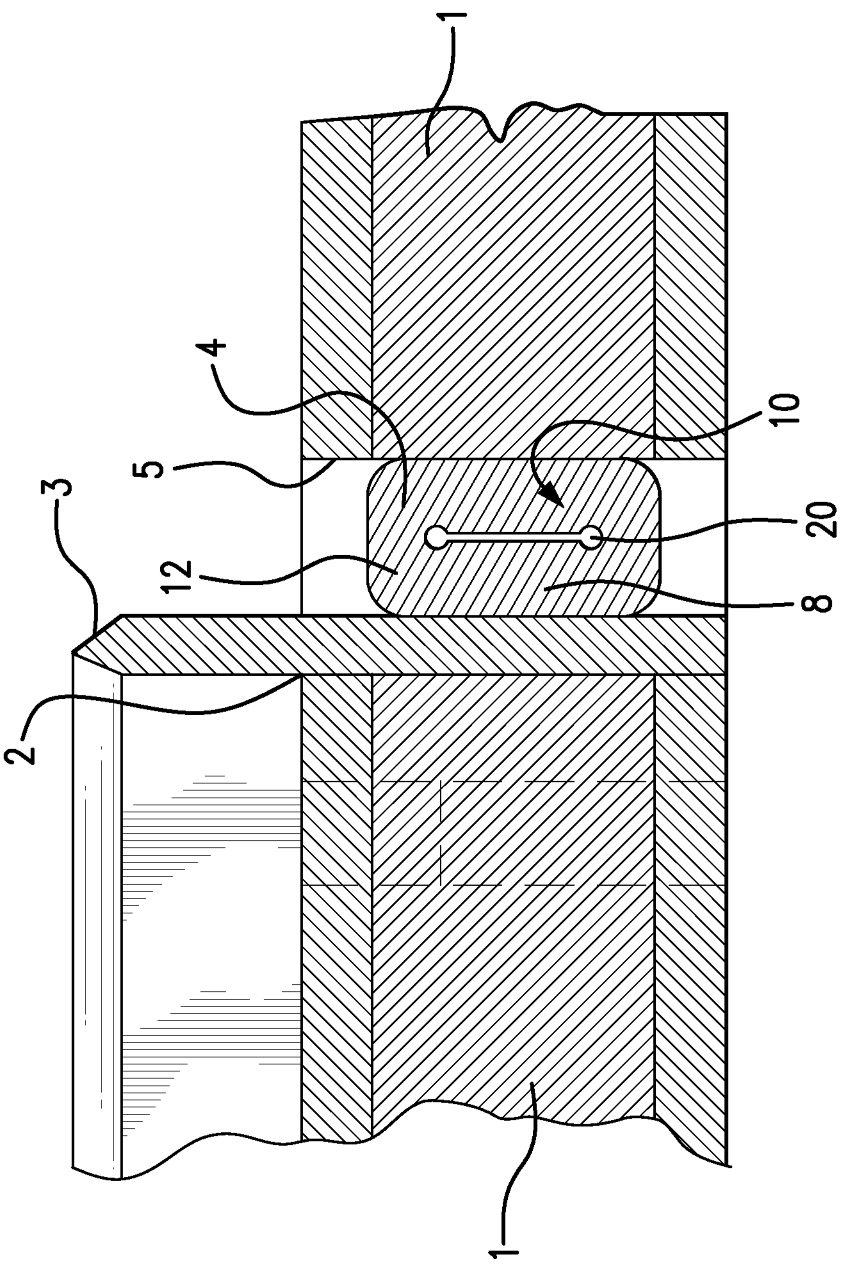
FIG. 2 is a sectional view of a die slot having a die positioned therein, and a kerf lock according to various embodiments of the present teachings, taken along line I-I of FIG. 1.

The present teachings will now be described in greater detail with reference to the accompanying drawings. Referring to FIGS. 1 and 2, a retaining board 1 comprising wood, plastic or other suitable material is provided with a plurality of die slots 2. Each die slot 2 can be formed by any conventional apparatus such as a laser beam, a drill, a saw, a jig saw, or the like. Steel rule dies 3 are provided, each of which has a width that is slightly less than the width of die slots 2. Accordingly, steel rule dies 3 can be inserted into respective die slots 2 as shown.

To prevent an inserted steel rule dies 3 from loosening within die slots 2, a plurality of kerf locks 4 according to the present teachings, are provided. Each kerf lock 4 can be positioned within a respective lock slot 5, adjacent a corresponding die slot 2. Lock slots 5 are in communication with die slots 2 via an open face. As will be apparent to one skilled in the art from the present application, the number and locations of the kerf locks and associated lock slots are determined by considering such factors as optimum securing of the inserted dies, configuration of the die cutting die, and manufacturing costs.

Figure 3:
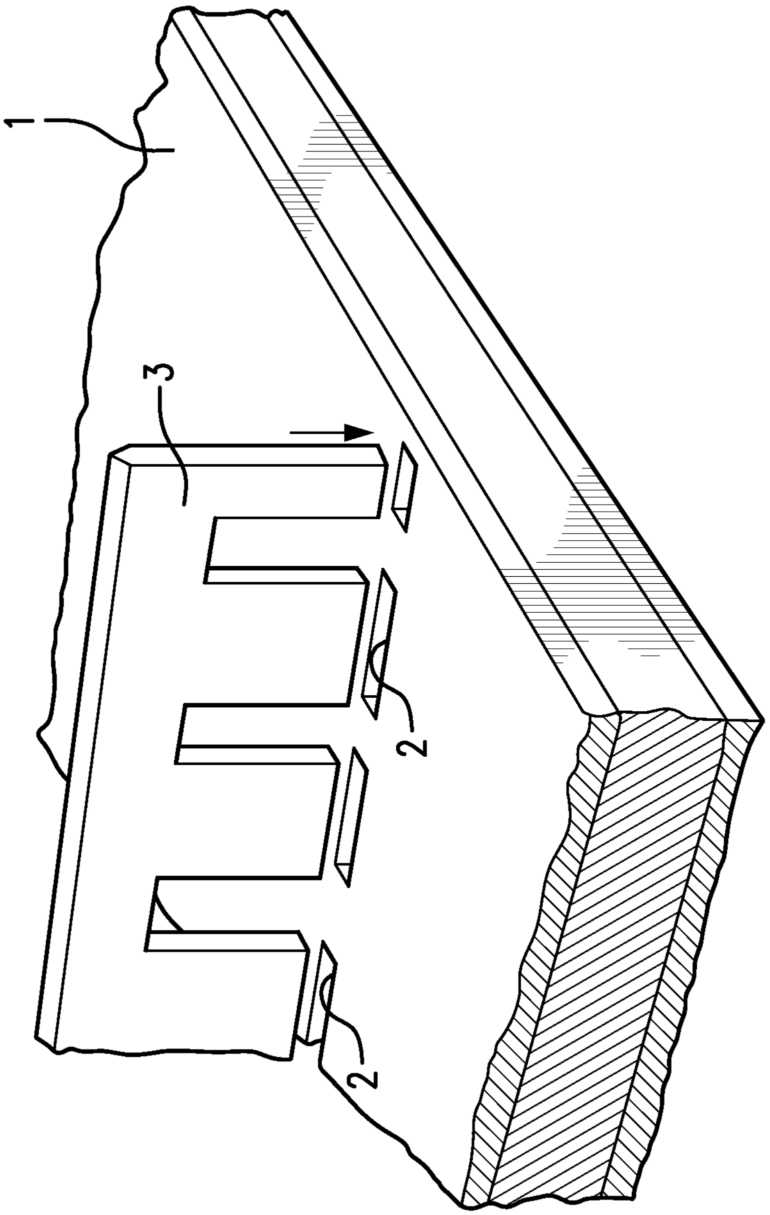
FIG. 3 is a perspective view of a system according to various embodiments of the present teachings showing a die cutting die adjacent a retaining board, before the die cutting die is inserted into die slots in the retaining board.

FIG. 3 shows the die cutting die 3 before it is inserted into the die slot 2. The die slot 2 does not have to be continuous and in some embodiments is not a continuous slot. The die cutting die has recesses which enable the die cutting die to bridge the retaining board between cut die slots.

The securing device or kerf lock is preferably of a unitary construction and can be easily injection molded. The kerf lock can comprise two arms connected by a top bridge at one end and connected by a bottom bridge at the other end. The kerf lock is generally zero-shaped (0-shaped) or rectangularly-shaped (-shaped).

When the kerf lock is disposed within a lock slot of the retaining board, one arm rests against the retaining board while the other arm has a force transmitting surface face which extends into the die slot. Both arms can be resilient and elastic. When a die cutting die is inserted into the die slot, the force transmitting arm is forced in a direction toward the resting or support arm. This creates a spring-type force such that the force transmitting surface of the force transmitting arm exerts a pressure against the die cutting die which secures the die cutting die in the die slot. While a sufficient pressure is applied to hold the die cutting die, the rule may be pulled out of the die slot with a pair of pliers, for example, a pair of Channel Lock® pliers. No disassembly of the lock or retaining board is necessary to pull out the die cutting die. The number of kerf locks can be varied to supply greater or lesser pressure to hold the die cutting die in the die slot.

The kerf lock may be manufactured by various methods which may include stamping or injection molding. The kerf lock preferably comprises a plastic. In some embodiments, the kerf lock is injection molded of polytetrafluoroethylene or polyoxymethylene, which provide a rigid, long lasting article that does not lose its elasticity over its lifetime.

As best seen in FIGS. 4-8, kerf lock 4 comprises a generally rectanguloid member 6 having two arms 8 and 10. When in operative position, one of the arms can be considered a support arm that would rest in a lock slot, and the other arm can be considered a resilient arm that would extend into a die slot in the absence of a die cutting die being inserted in the die slot. Arms 8 and 10 are connected at their top ends by a bridge 12 and at their bottom ends by a bridge 14. The width of each arm 8 and 10 is generally constant from the bottom of the arm to the top. A central through slot 16 is provided through the generally rectanguloid member 6. Central through slot 16 can end at, and intersect, a through hole 18 at a top end thereof, and can end at, and intersect, a through hole 20 at a bottom end thereof. For example, through holes 18 and 20 can each be defined by a radius of curvature of from about 0.005 inch to about 0.050 inch, for example, 0.025 inch. Generally rectanguloid member 6 can be defined by a radius of curvature of from about 1.000 inch to about 2.000 inches, for example, 1.500 inches. Resilient arm 8 can have a curved outer surface 48, resilient arm 10 can have a curved outer surface 50, and resilient arms 8 and 10 can bow outwardly relative to central through slot 16, as shown. Central through slot 16 can be defined by a radius of curvature of from about 0.900 inch to about 1.250 inches, for example, 1.041 inches. Bridge 12 intersects arms 8 and 10 at through hole 18 and bridge 14 intersects arms 8 and 10 at through hole 20. Central through slot 16 can have a first width 36 at its top end, and a second width 38 at its bottom end. Central through slot 16 can have a maximum width 34 that can be greater than first width 36 and greater than second width 38.

Both 8 and 10 can have the same height and the same thickness. The entire height of the kerf lock can be about 50 to 75 percent more than the height of arms 8 and 10 alone, with the added height being attributed to the heights of bridges 12 and 14. For example, kerf lock 4 can be defined by a length of from about 0.400 inch to about 0.800 inch, for example, 0.615 inch, a width of from about 0.200 inch to about 0.500 inch, for example, 0.284 inch, and a height from about 0.090 inch to about 0.150 inch, for example, 0.115 inch.

Arms 8 and 10 are separated normally by a central through slot 16 which has a width that increases from its ends toward its middle, as shown in FIGS. 4 and 7. When in use, a die cutting die forces one of arms 8 and 10 toward the other arm in a middle portion of kerf lock 4. Without a die cutting die in the die slot, at least a middle portion of one of the arms extends into the die slot when the kerf lock is in a lock slot.

To provide a rigid yet resilient kerf lock having an even stress distribution when in use, arms 8 and 10 and bridges 12 and 14 intersect with one another and the kerf lock has smooth curves at the corners thereof, such as rounded corners 22 and 24 shown in FIG. 4. For example, rounded corners 22 and 24 can be defined by a radius of curvature of, for example, from about 0.010 inch to about 0.050 inch, or 0.033 inch. Such a configuration prevents stress fractures that might otherwise occur at the intersections of these portions, and such a configuration facilitates insertion of the kerf lock into a lock slot and of a die cutting die into a die slot.

To facilitate the insertion of the die cutting die into a die slot of a retaining board according to the present teachings, a smoothly curved surface is provided on the kerf lock at the top bridge where initial contact is made with the die cutting die. The curved surface is continuous with the force transmitting surface of whichever arm extends into the die slot. The curved surface preferably has a radius of curvature which is from about 0.025 to about 0.050 inch.

Figure 6:
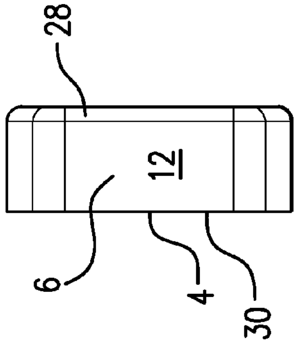
FIG. 6 is an end view of the kerf lock of FIG. 4.
Figure 5:
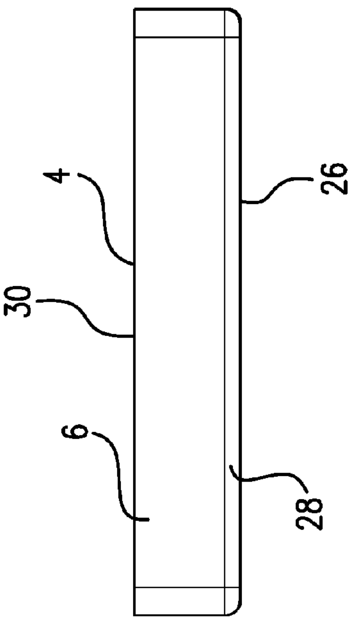
FIG. 5 is a side view of the kerf lock of FIG. 4.

To facilitate insertion of the kerf lock into a lock slot of a retaining board, top surface 26 of the kerf lock has smooth curved surfaces comprising rounded corners and a tapered edge 28. For example, tapered edge 28 can be defined by a radius of curvature of, for example, from about 0.010 inch to about 0.030 inch, or 0.016 inch. Bottom face 30 of kerf lock 4 can have tapered edges, such as those along top surface 26, but as shown in FIGS. 4-6, can also be free of a tapered edge.

The present teachings thus prevents down time associated with loose dies. The device and system securely hold die cutting dies in a simple, efficient, and economic manner. Also, the kerf lock is very durable and can secure dies of different widths in differently sized die slots.

Other embodiments will be apparent to those skilled in the art from consideration of the present specification and practice of various embodiments disclosed herein. It is intended that the present specification and examples be considered as exemplary only.

What is claimed is:

1. A securing device to secure a die cutting die in a die slot of a retaining board, the securing device comprising:

a generally rectanguloid member having a top, a bottom, a single central through slot, a first through hole adjacent the top of the generally rectanguloid member, and a second through hole adjacent the bottom of the generally rectanguloid member, the single central through slot comprising a top end having a first width and that intersects with the first through hole, the top end of the single central through slot terminating at the intersection of the slot with the first through hole, the single central through slot comprising a bottom end having a second width and that intersects with the second through hole, the bottom end of the single central through slot terminating at the intersection of the slot with the second through hole, the first through hole having a first diameter that is larger than the first width, the second through hole having a second diameter that is larger than the second width, the single central through slot, first through hole, and second through hole having respective openings wherein the openings lie on a common plane, the generally rectanguloid member further comprising a first resilient arm on one side of the single central through slot and a second resilient arm on an opposite side of the single central through slot, each of the first resilient arm and the second resilient arm having a curved outer surface that bows outwardly relative to the single central through slot, the first resilient arm and the second resilient arm being separated by the central through slot, wherein a first bridge connects the first and second resilient arms at the top of the generally rectanguloid member and partially defines the first through hole, a second bridge connects the first and second resilient arms at the bottom of the generally rectanguloid member and partially defines the second through hole, and both the first resilient arm and the second resilient arm are configured to move toward one another to create a spring-type force as the generally rectanguloid member is compressed laterally.

2. The securing device of claim 1, wherein the generally rectanguloid member comprises rounded top edges and rounded bottom edges.

3. The securing device of claim 1, wherein the securing device is of one-piece, unitary construction.

4. The securing device of claim 1, wherein the securing device comprises a plastic material.

5. The securing device of claim 1, wherein the securing device comprises a polyalkylene material, a polytetrafluoroethylene material, a polyoxymethylene material, a polyacetal material, a polyformaldehyde material, a phenolic resin material, or a combination thereof.

6. The securing device of claim 1, wherein the securing device comprises a polytetrafluoroethylene material.

7. The securing device of claim 1, wherein the securing device comprises a polyoxymethylene material.

8. The securing device of claim 1, wherein the single central through slot has a longitudinal middle and a width that increases from the top end to the longitudinal middle.

9. The securing device of claim 1, wherein the single central through slot has a longitudinal middle and a width that increases from the top end to the longitudinal middle and from the bottom end to the longitudinal middle.

10. The securing device of claim 1, wherein the single central through slot has a length and a maximum width, the length extends from the intersection with the first through hole to the intersection with the second through hole, and the length is from about five times to about 10 times the maximum width.

11. The securing device of claim 1, wherein the single central through slot has a length and a maximum width, the length extends from the intersection with the first through hole to the intersection with the second through hole, and the length is from about six times to about eight times the maximum width.

12. The securing device of claim 1, wherein the generally rectanguloid member comprises a top face and an opposite bottom face, and the top face has tapered edges.

13. The securing device of claim 1, wherein the single central through slot has a maximum width, and the maximum width is the same as the first diameter and the same as the second diameter.

14. A system comprising a retaining board, a die cutting die, and the securing device of claim 1, wherein the retaining board has formed therein an elongated die slot having opposite sides, and a lock slot intersecting the elongated die slot, the die cutting die is disposed within said die slot, and the securing device is disposed within the lock slot and in contact with the die cutting die.

15. The system of claim 14, wherein the retaining board has first and second opposing surfaces, the securing device has an upper surface and a lower surface, the upper surface is spaced from the first opposing surface, and the lower surface is spaced from the second opposing surface.

16. A system comprising a retaining board, a die cutting die, and a plurality of securing devices of claim 1, wherein the retaining board has formed therein an elongated die slot having opposite sides, and a plurality of lock slots each intersecting the elongated die slot, the die cutting die is disposed within said die slot, and the plurality of securing devices are respectively disposed within the plurality of lock slots and are in contact with the die cutting die.

17. The securing device of claim 1, wherein each of the single central through slot, the first through hole, and the second through hole has an entrance opening and an exit opening, the entrance openings are all arranged on a first common plane, and the exit openings are all arranged on second common plane.

18. The securing device of claim 17, wherein the first common plane and the second common plane are parallel to one another.

* * * * *